United States Patent
Chen et al.

(10) Patent No.: US 10,908,920 B2
(45) Date of Patent: Feb. 2, 2021

(54) METHOD FOR PRELOADING APPLICATION, COMPUTER READABLE STORAGE MEDIUM, AND TERMINAL DEVICE

(71) Applicant: Guangdong Oppo Mobile Telecommunications Corp., Ltd., Guangdong (CN)

(72) Inventors: Yan Chen, Guangdong (CN); Yaoyong Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 124 days.

(21) Appl. No.: 16/173,564

(22) Filed: Oct. 29, 2018

(65) Prior Publication Data

US 2019/0188000 A1  Jun. 20, 2019

(30) Foreign Application Priority Data

Dec. 20, 2017 (CN) .......................... 2017 1 1387747

(51) Int. Cl.
*G06F 9/445* (2018.01)
*G06F 9/50* (2006.01)
(Continued)

(52) U.S. Cl.
CPC ............ *G06F 9/445* (2013.01); *G06F 9/5016* (2013.01); *G06F 9/5027* (2013.01);
(Continued)

(58) Field of Classification Search
CPC ...... G06F 9/445; G06F 9/5016; G06F 9/5027; G06N 20/20; G06N 5/003; G06K 9/6282
See application file for complete search history.

(56) References Cited

U.S. PATENT DOCUMENTS 7,346,855 B2 * 3/2008 Hellyar ................. G06F 3/0235 715/780
8,176,437 B1 * 5/2012 Taubman ............ G06F 9/44578 715/757
(Continued)

FOREIGN PATENT DOCUMENTS

CN 102073504 A 5/2011
CN 103077224 A 5/2013
(Continued)

OTHER PUBLICATIONS

Predecting the next app that you're going to use, Yates, 2015 (Year: 2015).*
(Continued)

*Primary Examiner* — Aurel Prifti

(57) ABSTRACT

A method for preloading an application, a storage medium, and a terminal device are provided. The method includes the following. In response to a target application being detected to be closed, current state feature information of a terminal device is acquired. The current state feature information is input into a random forest prediction model corresponding to the target application, where the random forest prediction model is generated based on a usage regularity of the target application corresponding to historical state feature information of the terminal device. Whether to preload the target application is determined according to a prediction result of the random forest prediction model.

15 Claims, 6 Drawing Sheets

(51) Int. Cl.
  *G06K 9/62* (2006.01)
  *G06N 5/00* (2006.01)
  *G06N 20/20* (2019.01)
(52) U.S. Cl.
  CPC ........... *G06K 9/6282* (2013.01); *G06N 5/003* (2013.01); *G06N 20/20* (2019.01)

(56) References Cited

U.S. PATENT DOCUMENTS

| | | | | |
|---|---|---|---|---|
| 9,565,233 | B1* | 2/2017 | Ozuysal | H04L 67/02 |
| 9,632,692 | B2* | 4/2017 | Puthenveettil | G06F 3/0482 |
| 10,348,768 | B2* | 7/2019 | Childress | H04L 63/1433 |
| 2004/0193813 | A1* | 9/2004 | Nguyen | G06F 9/445 |
| | | | | 711/156 |
| 2009/0013157 | A1* | 1/2009 | Beaule | G06F 9/5016 |
| | | | | 712/225 |
| 2010/0070751 | A1* | 3/2010 | Chu | G06F 9/4406 |
| | | | | 713/2 |
| 2012/0167222 | A1* | 6/2012 | Kim | G06F 21/563 |
| | | | | 726/24 |
| 2012/0324481 | A1* | 12/2012 | Xia | G06F 9/485 |
| | | | | 719/320 |
| 2013/0173513 | A1* | 7/2013 | Chu | G06F 9/451 |
| | | | | 706/14 |
| 2013/0227461 | A1* | 8/2013 | Berger | G06F 3/0482 |
| | | | | 715/777 |
| 2014/0330764 | A1* | 11/2014 | Rhines | H04B 1/38 |
| | | | | 706/46 |
| 2014/0334304 | A1* | 11/2014 | Zang | H04L 47/2441 |
| | | | | 370/235 |
| 2014/0372356 | A1* | 12/2014 | Bilal | G06F 9/44578 |
| | | | | 706/46 |
| 2015/0256476 | A1* | 9/2015 | Kurtzman | H04L 47/70 |
| | | | | 709/226 |
| 2015/0293701 | A1* | 10/2015 | Kim | G06F 3/0671 |
| | | | | 710/5 |
| 2015/0324137 | A1* | 11/2015 | Wu | G06F 3/0619 |
| | | | | 713/2 |
| 2016/0350198 | A1* | 12/2016 | Neuvirth-Telem | G06F 11/006 |
| 2016/0357572 | A1* | 12/2016 | Myrick | G06F 11/1438 |
| 2016/0364272 | A1* | 12/2016 | Hou | G06F 9/485 |
| 2017/0026949 | A1* | 1/2017 | Ouyang | H04L 67/22 |
| 2017/0031690 | A1* | 2/2017 | Ren | G06F 9/445 |
| 2017/0061482 | A1* | 3/2017 | Guo | G06Q 30/0267 |
| 2017/0178027 | A1* | 6/2017 | Duggan | G06F 9/50 |
| 2017/0185250 | A1* | 6/2017 | Cho | G06F 3/0482 |
| 2018/0033406 | A1* | 2/2018 | Park | G09G 3/2096 |
| 2018/0174060 | A1* | 6/2018 | Velez-Rojas | G06F 3/013 |
| 2018/0219889 | A1* | 8/2018 | Oliner | G06N 3/08 |
| 2018/0240041 | A1* | 8/2018 | Koch | G06N 3/08 |
| 2018/0293087 | A1* | 10/2018 | Lee | G06F 9/44578 |
| 2018/0314310 | A1* | 11/2018 | Han | G06F 30/00 |
| 2019/0188000 | A1* | 6/2019 | Chen | G06F 9/5016 |
| 2019/0188005 | A1* | 6/2019 | Chen | G06F 9/542 |
| 2019/0188595 | A1* | 6/2019 | Chen | G06F 9/445 |
| 2019/0230186 | A1* | 7/2019 | Yellin | H04L 67/2847 |
| 2019/0286486 | A1* | 9/2019 | Ma | G06F 9/5027 |

FOREIGN PATENT DOCUMENTS

| | | | | |
|---|---|---|---|---|
| CN | 104991820 | A * | 10/2015 | |
| CN | 105431822 | A | 3/2016 | |
| CN | 105677477 | A | 6/2016 | |
| CN | 105893132 | A | 8/2016 | |
| CN | 105939416 | A | 9/2016 | |
| CN | 106095592 | A | 11/2016 | |
| CN | 106326420 | A | 1/2017 | |
| CN | 106406966 | A | 2/2017 | |
| CN | 107122201 | A | 9/2017 | |
| CN | 107861816 | A | 3/2018 | |
| EP | 3483728 | A1 * | 5/2019 | G06F 9/445 |
| EP | 3567479 | A1 * | 11/2019 | G06F 11/3442 |
| WO | WO-2019119969 | A1 * | 6/2019 | G06F 9/445 |
| WO | WO-2019119984 | A1 * | 6/2019 | G06N 20/00 |
| WO | WO-2019214416 | A1 * | 11/2019 | G06F 9/445 |
| WO | WO-2019218871 | A1 * | 11/2019 | G06F 9/44521 |

OTHER PUBLICATIONS

Prediction of user app usage behavior from geo spatial data, Zhao, 2016 (Year: 2016).*

Lior Rockach, Decision forest: Twenty years of research, Information Fusion, vol.27, Jun. 20, 2015 (Jun. 20, 2015), pp. 111-125, XP055587348,US ISSN: 1566-2535, DOI: 10.1016/j.inffus.2015.06.005, the whole document.

Extended European search report issued in corresponding European application No. 18204234.1 dated May 17, 2019.

International search report issued in corresponding international application No. PCT/CN2018/109870 dated Jan. 4, 2019.

English translation of first office action issued in corresponding CN application No. 201711387747.7 dated May 26, 2020.

R Language in data science; published by Jian Li, dated Jul. 31, 2015; pp. 201-205.

The second OA with English Translation issued in corresponding CN application No. 201711387747.7 dated Nov. 18, 2020.

* cited by examiner

METHOD FOR PRELOADING APPLICATION, COMPUTER READABLE STORAGE MEDIUM, AND TERMINAL DEVICE

CROSS-REFERENCE TO RELATED APPLICATION(S)

This application claims priority to Chinese Patent Application No. 201711387747.7, filed on Dec. 20, 2017, the content of which is hereby incorporated by reference in its entirety.

TECHNICAL FIELD

This application relates to the field of computer technology, and particularly to a method for preloading an application, a storage medium, and a terminal device.

BACKGROUND

At present, with rapid development of smart terminal technologies, smart devices such as smart phones, tablet computers, and smart televisions have become indispensable electronic devices in people's life.

The smart terminal may be installed with various applications (application software, APP). Generally, only when a user opens an application does the application start to be loaded. However, storage space occupied by the application is getting larger and larger, and loading time is getting longer and longer, wasting time of the user. In order to make the applications run more smoothly, some smart terminals can prepare loading resources for some applications in advance, that is, preload some applications in advance.

However, the applications cannot be preloaded at will, because if too many resources are preloaded, they will take up too much storage space and power consumption will become larger, which can affect fluency on the use of the terminal seriously. Therefore, it is important to optimize preloading mechanisms and reduce power consumption of the terminal.

SUMMARY

Implementations of the disclosure provide a method for preloading an application, a storage medium, and a terminal device.

According to a first aspect, a method for preloading an application is provided. The method includes the following.

In response to a target application being detected to be closed, current state feature information of a terminal device is acquired. The current state feature information is input into a random forest prediction model corresponding to the target application, where the random forest prediction model is generated based on a usage regularity of the target application corresponding to historical state feature information of the terminal device. Whether to preload the target application is determined according to a prediction result of the random forest prediction model.

According to a second aspect, a terminal device is provided. The terminal device includes at least one processor and a computer readable storage. The computer readable storage is coupled to the at least one processor and stores at least one computer executable instruction thereon which, when executed by the at least one processor, causes the at least one processor to carry out the following actions.

In response to a target application being detected to be closed, current state feature information of a terminal device is acquired. Whether to preload the target application is determined according to the current state feature information and a random forest prediction model, where the random forest prediction model is generated based on a usage regularity of the target application corresponding to historical state feature information of the terminal device.

According to a third aspect, a non-transitory computer readable storage medium is provided. The non-transitory computer readable storage medium is configured to store a computer program which, when executed by a processor, causes the processor to carry out the following.

In response to a target application being detected to be closed, current state feature information of a terminal device is acquired. The current state feature information is input into a random forest prediction model corresponding to the target application, where the random forest prediction model is generated based on a usage regularity of the target application corresponding to historical state feature information of the terminal device. Whether to preload the target application is determined according to a prediction result of the random forest prediction model.

DETAILED DESCRIPTION

Figure 1:
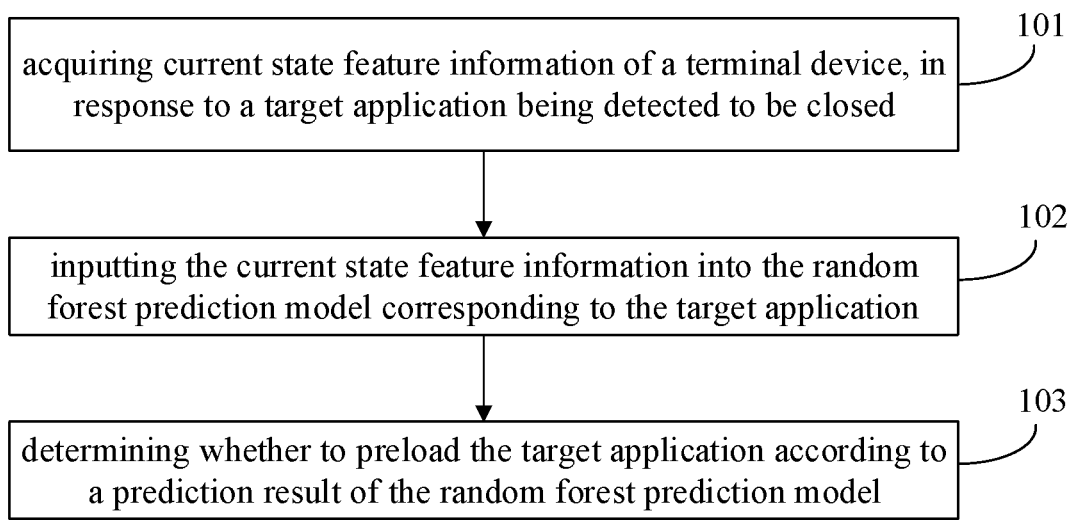
FIG. 1 is a schematic flow chart illustrating a method for preloading an application according to an implementation of the disclosure.

Technical solutions of the present disclosure will be further described below through implementations with reference to the accompanying drawings. It will be appreciated that the implementations are described herein for the purpose of explaining the disclosure rather than limiting the disclosure. In addition, it should also be noted that, for the convenience of description, only some rather than all structures related to the present disclosure are illustrated in the accompanying drawings.

Before discussing the exemplary implementations in more detail, it should be mentioned that some exemplary implementations are described as processes or methods of a flowchart. In the flowchart, although each step is depicted as being processed sequentially, some of these steps may be performed in parallel, concurrently, or simultaneously. In addition, the order of the steps can be rearranged. The process of one step may be terminated when a corresponding operation is completed, but the implementations may also have additional steps that are not illustrated in the drawings. The process may correspond to a method, a function, a procedure, a subroutine, a subprogram, and the like.

Preloading an application of a terminal device is a common and effective method for improving user experience. Preparing loading resources for some applications in advance allows the applications to run more smoothly.

In the related art, applications are preloaded mainly based on a statistical method. For example, if there are only a few applications that are most frequently used by a user, all these applications will be preloaded. For another example, applications are ranked according to usage habits of the user and applications with higher rank are preloaded. However, in the above methods, since association information of the applications, time information, state information of the terminal, and the like are not taken into account, prediction accuracy for applications to-be-preloaded is not high and too many resources need to be preloaded. In fact, the user uses only one application at a next moment, which affects the user experience. Therefore, it is important to accurately predict which application the user will launch next time.

Taking the above into consideration, a method for preloading an application and a terminal device are provided. In the method for preloading an application, in response to a target application being detected to be closed, current state feature information of a terminal device is acquired. Then whether to preload the target application can be determined based on the current state feature information and the random forest prediction model corresponding to the target application. In one implementation, the current state feature information is input into the random forest prediction model, where the random forest prediction model is generated based on a usage regularity of the target application corresponding to historical state feature information of the terminal device. Implementations will be detailed below.

FIG. 1 is a schematic flow chart illustrating a method for preloading an application according to an implementation of the disclosure. The method can be implemented by a device for preloading an application. The device can be implemented with software and/or hardware and can be generally integrated into a terminal device. As illustrated in FIG. 1, the method begins at block 101.

At block 101, current state feature information of a terminal device is acquired, in response to a target application being detected to be closed.

In this implementation, in response to the target application being detected to be closed, the current state feature information of the terminal device is acquired, so as to control the preloading of the target application.

The target application can be any one or more applications of the terminal device. It can be understood that, when one or more applications are detected to be closed, the one or more applications can be used as the target application. In the case that the target application is detected to be cleared with cleanup software of the terminal device, or in the case that the target application is completely closed by a user from the foreground, or in the case that an application running in the background is closed, it indicates that the target application is closed. It should be noted that, regarding the manner in which the target application is closed, the implementations of the disclosure are not limited herein.

When the target application is detected to be closed, the current state feature information of the terminal device is acquired. The current state feature information can be acquired from a memory, a server, and the like. The current state feature information of the terminal device can include at least one of: time information, a date category, a switching state of a mobile data network, a connection state of a wireless hotspot, identity information of a connected wireless hotspot, an application currently running, a previous foreground application, a length of stay of the target application in the background, a time point at which the target application was last switched to the background, plugging and unplugging states of an earphone jack, a charging state, power information of a battery, a display duration of a screen, a movement state of the terminal device, location information, a connection state of a Bluetooth, a running duration of the target application in the foreground before the target application is closed, and a most recent screen-off duration.

The time information can be understood as a current time period corresponding to the terminal device. For example, the time information may include morning rush hour, midday rush hour, evening rush hour, working time, and rest time. Alternatively, the time information can also be configured by equally dividing one day with 24 hours (0:00 am-24:00 pm). For example, one day is divided into 6 time periods with each time period being 4 hours. The time information can be recorded in the form of a timestamp. The date category may include workdays and holidays and may also be recorded in the form of a timestamp. The switching state of the mobile data network may include an on-state and an off-state of the mobile data network. It can be understood that, when the mobile data network is in the on-state, the terminal device can conduct web browsing and a series of Internet operations through the mobile data network; when the mobile data network is in the off-state, the terminal device cannot conduct Internet operations such as web browsing through the mobile data network. The connection state of the wireless hotspot may include a connected state and a disconnected state of the wireless hotspot. When the wireless hotspot is in the connected state, the current state feature information may further include the identity information of the connected wireless hotspot. The identity information of the connected wireless hotspot may include a service set identifier (SSID) and a basic service set identity (BSSID). The application currently running can be understood as an application running in the foreground or the background of the terminal device. Identifier information of the application currently running, which can uniquely identify the application currently running, such as a package name and/or a component name of the application currently running, can be obtained. The previous foreground application can be understood as an application that ran in the foreground before a current foreground application runs in the foreground of the terminal device. The length of stay of the target application in the background can be understood as a length from the target application being switched to the background to being completely cleared from the background. When any one or more applications of the terminal device are closed, the application(s) can be referred to as the target application. The target application can be the same as or different from the application currently running. Similarly, the target application can be the same as or different from the previous foreground application. The time point at which the target application was last switched to the background can be understood as the moment at which the target application was last switched to the background. According to the time point, a length from the time point at which the target application was last switched to the background to a current moment can be determined. The plugging and unplugging states of an earphone jack can be understood as an earphone and the terminal device being connected or disconnected. The charging state includes a charging mode and a non-charging mode, and may further include a charging mode type when the terminal device is in the charging mode. The charging mode type can include a fast charging mode and a normal charging mode. In the fast charging mode, the terminal device is charged by a fast charging power adapter (such as a mobile power supply). In the normal charging mode, the terminal device is charged by a normal power adapter (such as an original charger of the terminal device). The power information of the battery can be understood as a current remaining power of the terminal. The display duration of the screen can be understood as a most recent screen-on duration. The movement state may include a current speed and/or acceleration of the terminal device. The location information can be understood as the specific location where the terminal device is currently located, including provinces, cities, districts, counties, even specific to street names, building names, and the like. The connection state of the Bluetooth may include a connected state and a disconnected state or an off-state of the Bluetooth. The running duration of the target application in the foreground before the target application is closed can be understood as a duration for which the target application runs in the foreground before being closed. The most recent screen-off duration can be understood as a duration from a time point at which the screen was last turned off to a time point at which the screen was lit up.

Hereinafter, whether to preload the target application is predicted based on the current state feature information and a random forest prediction model corresponding to the target application.

At block 102, the current state feature information is input into the random forest prediction model corresponding to the target application.

The random forest prediction model is generated based on a usage regularity of the target application corresponding to historical state feature information of the terminal device.

The random forest prediction model corresponding to the target application can be understood as a learning model that quickly determines whether the target application is about to be launched after the current state feature information is input. The random forest prediction model can be generated based on the usage regularity of the target application corresponding to the historical state feature information of the terminal device. That is to say, the usage regularity of the target application corresponding to the historical state feature information of the terminal device is used as a training sample and the training sample is trained and learned according to a random forest scheme to generate the random forest prediction model. The random forest scheme is determined by preset decision tree schemes and the preset decision tree schemes will be described in detail below.

It should be noted that, when there is one target application, that is, when only one application is detected to be closed, the current state feature information is input into a random forest prediction model corresponding to the target application (the application closed). When there are multiple target applications, that is, when multiple applications are detected to be closed, the current state feature information is respectively input into each of the random forest prediction models corresponding to the multiple target applications (the multiple applications closed). For example, when both application A and application B are detected to be closed at the same time, the target application will include application A and application B. Then, the current state feature information is respectively input into a random forest prediction model A1 corresponding to application A and a random forest prediction model B1 corresponding to application B.

At block 103, whether to preload the target application is determined according to a prediction result of the random forest prediction model.

In this implementation, whether to preload the target application is determined according to the prediction result of the random forest prediction model. That is to say, the prediction result is configured to indicate whether to preload the target application. After the current state feature information is input into the random forest prediction model corresponding to the target application, the random forest prediction model comprehensively analyzes the current state feature information and provides a determination result on whether to preload the target application. For example, the random forest prediction model may respectively provide a first probability value of preloading the target application and a second probability value of not preloading the target application, where the sum of the first probability value and the second probability value is 1. When the first probability value is greater than the second probability value, the target application will be preloaded; when the first probability value is less than the second probability value, the target application will not be preloaded; when the first probability value is equal to the second probability value, whether to preload the target application can be determined based on user selection. For another example, the random forest prediction model may directly provide a value such as "0" or "1". In such situation, "1" indicates "preloading" and "0" indicates "not preloading".

A random forest prediction model may include multiple decision tree prediction models, in other words, multiple decision tree prediction models form a random forest prediction model. Inputting the current state feature information into the random forest prediction model corresponding to the target application can be understood as inputting the current state feature information into each decision tree prediction model in the random forest prediction model corresponding to the target application. It is to be understood that, whether to preload the target application is determined according to a comprehensive determination of a prediction result of the each decision tree prediction model in the random forest prediction model. The each decision tree prediction model in the random forest prediction model can give a determination result on whether to preload the target application. For example, when the target application is to be preloaded, the determination result is "yes"; when the target application is not to be preloaded, the determination result is "no". According to the determination result of the each decision tree prediction model in the random forest prediction model, whether to preload the target application can be determined. For example, in the random forest prediction model, when the number of decision tree prediction models giving the determination result of "yes" is greater than the number of decision tree prediction models giving the determination result of "no", the target application can be preloaded; when the number of the decision tree prediction models giving the determination result of "yes" is less than the number of the decision tree prediction models giving the determination result of "no", the target application will not be preloaded. In addition, when the number of the decision tree prediction models giving the determination result of "yes" is equal to the number of the decision tree prediction models giving the determination result of "no", whether to preload the target application can be determined based on user selection.

It should be noted that, when the target application includes multiple applications, in other words, when there are multiple target applications, a determination result of whether to preload the a target application provided by a random forest prediction model corresponding to the target application may be the same as or different from other determination results provided by other random forest prediction models corresponding to other target applications, which is not limited herein. For example, there are two target applications including target application A and target application B and the determination results thereof can be different. A random forest prediction model A1 corresponding to target application A may give a determination result of preloading target application A, but a random forest prediction model B1 corresponding to application B may give a determination result of not preloading target application B.

According to the method for preloading the application, the current state feature information of the terminal device is acquired when the target application is closed. The current state feature information is then input into the random forest prediction model corresponding to the target application, where the random forest prediction model is generated based on the usage regularity of the target application corresponding to the historical state feature information of the terminal device. At last, whether to preload the target application is determined according to the prediction result of the random forest prediction model. By adopting the above method, the technical problems of preloading too many resources for the application, occupying too many resources, increasing power consumption, and even affecting fluency on the use of the terminal can be solved. In addition, accuracy of determining whether to preload the target application can be improved effectively, system power consumption and memory occupancy of the terminal can be further reduced, and application preloading mechanisms can be optimized.

In some implementations, the method further includes operation of constructing the random forest prediction model corresponding to the target application.

In this implementation, the random forest prediction model corresponding to the target application is constructed according to samples of the target application and sample labels corresponding to the samples. The samples are configured to indicate the historical state feature information of the terminal device at time points at which the target application is closed and the sample labels are configured to indicate whether the target application is launched within a preset time period starting from each time point at which the target application is closed.

It can be understood that, the samples collected in the preset collection period and the sample labels corresponding to the samples are used as a training sample set, and then the training sample set is trained based on a preset random forest scheme to generate the random forest prediction model.

In some implementations, before the random forest prediction model is constructed, the method further includes the following. In a preset collection period, the historical state feature information of the terminal device is collected at each time point at which the target application is closed as the samples of the target application. Monitor whether the target application is launched within the preset time period starting from the each time point at which the target application is closed. Record monitoring results as the sample labels of the samples. In this way, the usage regularity of the target application corresponding to the historical state feature information of the terminal device can be fully utilized to generate the random forest prediction model, application preloading mechanisms are further optimized, and accuracy of determining whether to preload the target application is improved.

In this implementation, the target application is sampled in the preset collection period and the random forest prediction model corresponding to the target application is constructed. It can be understood that, the historical state feature information of the terminal device at the time point at which the target application is closed is acquired in the preset collection period as the samples of the target application. For example, the preset collection period is two weeks, and in the two weeks, historical state feature information corresponding to each time point at which the target application is closed as samples of the target application. For example, if the target application is closed at 8:00 am, a first selection will be conducted at 8:00 am, that is, historical state feature information of the terminal device at 8:00 am is acquired as a first sample of the target application; if the target application is closed at 8:10 am again, a second selection will be conducted at 8:10 am, that is, historical state feature information of the terminal device at 8:10 am is acquired as a second sample of the target application; if the target application is closed at 8:30 am again, a third selection will be performed at 8:30 am, that is, historical state feature information of the terminal device at 8:30 am is acquired as a third sample of the target application; and so on. In the above manner, the historical state feature information of the terminal device at the each time point at which the target application is closed is acquired as the samples of the target application. For one example, the preset collection period can be adaptively set according to a frequency at which the target application is closed. If the target application is closed more frequently, the preset collection period can be adaptively set shorter; if the target application is closed less frequently, the preset collection period can be adaptively set longer. For another example, the preset collection period can also be adaptively set according to user requirements. If high prediction accuracy is required for the target application, the preset collection period can be set longer; if low prediction accuracy is required for the target application, the preset collection period can be set shorter. For still another example, the preset collection period may also be set according to a capability of processing data volume by the terminal. If the terminal has a high capability to process the data volume of the training sample for establishing the random forest prediction model, the preset collection period may be set longer; if the terminal has a low capability to process the data volume of the training sample for establishing the random forest prediction model, the preset collection period may be set shorter. In this implementation, a length and a setting manner of the preset collection period are not limited.

Similar with the current state feature information, the historical state feature information of the terminal device can include at least one of: time information, a date category, a switching state of a mobile data network, a connection state of a wireless hotspot, identity information of a connected wireless hotspot, an application currently running, a previous foreground application, a length of stay of the target application in the background, a time point at which the target application was last switched to the background, plugging and unplugging states of an earphone jack, a charging state, power information of a battery, a display duration of a screen, a movement state of the terminal device, location information, a connection state of a Bluetooth, a running duration of the target application in the foreground before the target application is closed, and a most recent screen-off duration.

In this implementation, in the preset collection period, the historical state feature information of the terminal device at the each time point at which the target application is closed is collected as the samples of the target application. Monitor whether the target application is launched within the preset time period starting from the each time point at which the target application is closed. For example, if the target application is closed at 8:00 am, the historical state feature information of the terminal device at 8:00 am is acquired as a sample of the target application. Thereafter, whether the target application is launched within the preset time period starting from the time point at which the target application is closed is detected. For example, if the preset time period is five minutes starting from the each time point at which the target application is closed, whether the target application is re-launched in the period of 8:00 am to 8:05 am is detected. The monitoring results are recorded as the sample labels of the samples of the target application, where the monitoring results indicate whether the target application is used again within the preset time period starting from the each time point at which the target application is closed. For example, when it is detected that the target application is used again within the preset time period starting from the time point at which the target application is closed, use "1" to indicate such situation and the sample is labeled as "1", in other words, "1" is used as a sample label of the sample; when it is detected that the target application is not used again within the preset time period starting from the time point at which the target application is closed, use "0" to indicate such situation and the sample is labeled as "0", in other words, "0" is used as a sample label of the sample. In some implementations, the random forest prediction model corresponding to the target application is constructed according to the samples of the target application and the sample labels corresponding to the samples as follows. Obtain k sample sets via sample selection of the samples for k times, where each sample set includes m samples randomly selected from the samples. For each sample set of the k sample sets, a decision tree prediction model is constructed according to the m samples included in the sample set and sample labels corresponding to the m samples. The random forest prediction model corresponding to the target application is constructed according to the k decision tree prediction models. In this way, the number of the decision tree prediction models included in the random forest prediction model can be set randomly, which improves randomness of constructing the decision tree prediction models. Furthermore, accuracy and precision of predicting whether to preload the target application by the random forest prediction model constructed can be improved.

In this implementation, samples are selected from the samples collected in the preset collection period for k times and samples selected each time are taken as a sample set. For each selection, m samples are randomly selected from the samples collected in the preset collection period to form a sample set. Exemplarily, if the samples collected in the preset collection period contain 500 sample data in total, the 500 sample data will be selected for 7 times to obtain 7 sample sets. If, in each selection, 200 sample data are randomly selected from the 500 sample data, the 200 sample data randomly selected will form a sample set.

The decision tree prediction model for each sample set of the k sample sets is constructed according to the m samples included in the sample set and the sample labels corresponding to the m samples. It can be understood that, a first sample set obtained by a first section and sample labels corresponding to samples included in the first sample set are used as a first training sample set. The first training sample set is trained and learned based on a preset decision tree scheme, to generate a corresponding decision tree prediction model, for example, recorded as a first decision tree prediction model. A second sample set obtained by a second selection and sample labels corresponding to samples included in the second sample set are used as a second training sample set. The second training sample set is trained and learned based on the preset decision tree scheme, to generate a corresponding decision tree prediction model, for example, recorded as a second decision tree prediction model. In a similar way, k decision tree prediction models are constructed in total. The preset decision tree scheme can include any one of a classification and regression tree (CART), ID3, and C4.5. The random forest prediction model corresponding to the target application is constructed according to the k decision tree prediction models.

In some implementations, the decision tree prediction model for the each sample set of the k sample sets is constructed according to the m samples included in the sample set and the sample labels corresponding to the m samples as follows. n state features are randomly selected from features included in the historical state feature information as target features. For each sample in the each sample set, a sample feature set is formed by selecting, from the historical state feature information corresponding to the sample, feature information values corresponding to the target features. The decision tree prediction model corresponding to the sample set is constructed according to all sample feature sets and the sample label corresponding to each sample feature set. In this way, several state features randomly selected from the features included in the historical state feature information can be used as target features for constructing various decision tree prediction models in the random forest prediction model. Under the premise of ensuring accuracy of predicting whether to preload the target application by the random forest prediction model, data volume processed during constructing the random forest prediction model can be effectively reduced.

In this implementation, for the each sample set of the k sample sets, n state features are randomly selected as the target features corresponding to the sample set from state features such as the following: time information, a date category, a switching state of a mobile data network, a connection state of a wireless hotspot, identity information of a connected wireless hotspot, an application currently running, a previous foreground application, a length of stay of the target application in the background, a time point at which the target application was last switched to the background, plugging and unplugging states of an earphone jack, a charging state, power information of a battery, a display duration of a screen, a movement state of the terminal device, location information, a connection state of a Bluetooth, a running duration of the target application in the foreground before the target application is closed, and a most recent screen-off duration.

For the each sample in the each sample set, the feature information values corresponding to the target features are selected from the historical state feature information corresponding to the sample, to form the sample feature set corresponding to the sample in the sample set. For example, for the first sample set obtained through the first selection, select the following five state features as target features corresponding to the first sample set: the connection state of the wireless hotspot, the charging state, the power information of the battery, the location information, and the connection state of the Bluetooth from the above state features. The first sample set includes 200 samples in total. For each sample in the first sample set, feature information values corresponding to the target features in the historical state feature information corresponding to the sample are selected as a sample feature set corresponding to the sample. For example, for a first sample in the first sample set, a feature information value corresponding to the connection state of the wireless hotspot is "0", where "0" indicates that the wireless hotspot is in the disconnected state and "1" indicates that the wireless hotspot is in the connected state; a feature information value corresponding to the charging state is "1", where "0" indicates that the terminal device is in the non-charging mode and "1" indicates that the terminal device is in the charging mode; a feature information value corresponding to the power information of the battery is "0", where "0" indicates that the terminal device has a low remaining power and "1" indicates that the terminal device has a high remaining power; a feature information value corresponding to the location information is "0", where "0" indicates that the terminal device is not at home and "1" indicates that the terminal device is at home; a feature information value corresponding to the connection state of the Bluetooth is "0", where "0" indicates that the Bluetooth is in the disconnected state and "1" indicates that the Bluetooth is in the connected state. The above feature information values forms a sample feature set corresponding to the first sample. It is understood that, the target features corresponding to the first sample set are the connection state of the wireless hotspot, the charging state, the power information of the battery, the location information, the connection state of the Bluetooth, based on this, the sample feature set corresponding to the first sample is {0, 1, 0, 0, 0}. Similarly, sample feature sets corresponding to other samples in the first sample set are obtained respectively. A decision tree prediction model corresponding to the first sample set is constructed according to sample feature sets corresponding to all the samples in the first sample set and sample labels corresponding to the sample feature sets.

When the decision tree prediction model corresponding to the sample set is constructed according to all the sample feature sets and the sample label corresponding to the each sample feature set, a target feature with the largest classification information gain is sequentially selected from the target features as a split feature of the decision tree prediction model. In this implementation, for each state feature of the target features, a classification information gain of a current state feature is calculated based on a preset classification information gain calculation method. That is, based on the preset classification information gain calculation method, a classification information gain of each state feature of the target features is separately calculated. For example, the target features include 7 state features; in this case, classification information gains of the 7 state features are calculated based on the preset classification information gain calculation method. For example, in the k sample sets obtained by selecting samples from the samples collected in the preset collection period for k times, one sample set is Y and one state feature of the target features is X; in this case, a classification information gain of the state feature X relative to the sample set Y is g(Y, X)=H(Y)−H(Y|X) Regarding to the above formula, $$H(Y|X) = \sum_{i=1}^{n} P_i H(Y | X = x_i),$$

n denotes a total number of values of state feature X; $P_i$ denotes a ratio of the number of samples in the sample set Y with $X=x_i$ to the number of total samples in the sample set Y;

$$H(Y) = -\sum_{i=1}^{2} p_i \log p_i$$

denotes an empirical entropy of the sample set Y; $P_1$ denotes the number of positive samples/the total samples, and $P_2$ denotes the number of negative samples/the total samples. The number of the total samples represents the number of the total samples included in the sample set Y; the number of the positive samples represents the number of samples with sample labels indicating "used"; and the number of the negative samples represents the number of samples with sample labels indicating "unused". For example, the connection state of the wireless hotspot includes the connected state and the disconnected state of the wireless hotspot, where "1" indicates that the wireless hotspot is in the connected state and "0" indicates that the wireless hotspot is in the disconnected state. As a result, in the case that the state feature X is the connection state of the wireless hotspot, the value of X can be 0 or 1. For X=1, when tested as "yes" or "no", the sample set Y can be divided into two subsample sets, that is, $Y_1$ and $Y_2$. That is, regarding to the connection state of the wireless hotspot, the sample set Y can be divided into two subsample sets, including $Y_1$ and $Y_2$ respectively. It is to be noted that, the subsample set $Y_1$ indicates that the wireless hotspot is in the connected state and the subsample set $Y_2$ indicates that the wireless hotspot is in the disconnected state. A probability value corresponding to the subsample set $Y_1$ can be expressed by $P_1$ and a probability value corresponding to the subsample set $Y_2$ can be expressed by $P_2$, where $$P_1 = \frac{Y_1}{Y}$$

represents a ratio of the number of samples included in the subsample set $Y_1$ to the number of the samples included in the sample set Y, and $$P_2 = \frac{Y_2}{Y}$$

represents a ratio of the number of samples included in the subsample set $Y_2$ to the number of the samples included in the sample set Y. In the process of constructing the decision tree prediction model, the target feature with the largest classification information gain is sequentially selected as the split feature. The decision tree prediction model corresponding to the sample set is constructed according to all the sample feature sets and the sample label corresponding to the each sample feature set. It is to be understood that, the target feature with the largest classification information gain is sequentially selected as the split feature of each split node in the decision tree prediction model; two child nodes are generated from a current split node; and the sample set Y is sequentially assigned to the two child nodes according to the target feature. The above process will not stop until a stopping condition for constructing the decision tree prediction model is met. The stopping condition may include a condition under which a classification information gain is less than a preset threshold and may also include a condition under which all subsamples in the two child nodes split belong to the same category.

In some implementations, the method further includes the following. For each decision tree prediction model in the random forest prediction model corresponding to the target application, acquire an output result of the decision tree prediction model, where the output result is configured to indicate "preloading" or "not preloading". The number of output results indicating "preloading" and the number of output results indicating "not preloading" are counted. An output result corresponding to a larger number is determined as a prediction result of the random forest prediction model. Whether to preload the target application is determined according to the prediction result of the random forest prediction model. In this way, it is possible to determine reasonably whether to preload the target application according to voting results of various decision tree prediction models in the random forest prediction model.

It is to be noted that, the output result of a leaf node that matches the current state feature information in the decision tree prediction model is acquired as the output result of the decision tree prediction model.

In other words, for the each decision tree prediction model in the random forest prediction model corresponding to the target application, a classification result output by the leaf node that matches the current state feature information in the decision tree prediction model is acquired, where the classification result output by the leaf node can be understood as the output result of the decision tree prediction model. Vote for the classification result corresponding to each decision tree prediction model and determine a classification result with the majority vote as the prediction result, for example, count the number of output results indicating "preloading" and the number of output results indicating "not preloading" and determine an output result corresponding to a larger number as the prediction result. Determine whether to preload the target application according to the prediction result.

In this implementation, for the each decision tree prediction model in the random forest prediction model corresponding to the target application, the current state feature information is input into the random forest prediction model corresponding to the target application, that is, into the each decision tree prediction model in the random forest prediction model corresponding to the target application. In a current decision tree prediction model, there is one and only one leaf node that matches the current state feature information. Therefore, the classification result output by the leaf node matching the current state feature information in the current decision tree prediction model can be obtained. Exemplarily, the classification result may include "yes" and "no", where "yes" may indicate preloading the target application and "no" may indicate not preloading the target application. For the each decision tree prediction model in the random forest prediction model, the classification result output by the leaf node matching the current state feature information can be obtained.

Vote for the classification result corresponding to the each decision tree prediction model and determine the classification result with the majority vote as the prediction result. It can be understood that, classification results output by various decision tree prediction models in the random forest prediction model are counted, such as counting the number of classification results being "yes" and the number of classification results being "no". If the number of the classification results being "yes" is greater than the number of the classification results being "no", "yes" will be used as a result of predicting whether to preload the target application by the random forest prediction model. That is, the result of predicting whether to preload the target application by the random forest prediction model is: preloading the target application. If the number of the classification results being "yes" is less than the number of the classification results being "no", "no" will be used as a result of predicting whether to preload the target application by the random forest prediction model. That is, the result of predicting whether to preload the target application by the random forest prediction model is: not preloading the target application.

In some implementations, the method further includes the following. Storage space information of the terminal device is acquired when determining to preload the target application according to the prediction result. The target application is preloaded when the storage space information is greater than a preset space threshold. It is possible to determine reasonably whether to preload the target application according to the storage space information of the terminal device. The target application can be preloaded without affecting an occupancy rate of system resources. Fluency of the application in use and user experience can be further improved.

In this implementation, storage space information of the terminal device can be further acquired when determining to preload the target application according to the prediction result output by the random forest prediction model. The storage space information of the terminal device may include a remaining size at a current moment, and may also include an occupancy rate of storage space of the terminal device at a current moment. It can be understood that, the storage space information reflects a size of the storage space available in the terminal device at the current moment. If the storage space information is greater than the preset space threshold, the target application will be preloaded. Thus, it can be understood that, when the target application is determined to be preloaded according to the prediction result output by the random forest prediction model and available storage space of the terminal device is sufficient, the target application can be preloaded.

In this implementation, the process of preloading and data resources preloaded are not limited. For example, the target application can be allocated with corresponding hardware resources and relevant data required for launching can be preloaded based on the hardware resources allocated. In addition, the data resources preloaded can be determined according to the type of the target application. For example, if the target application is a social application, a splash screen, a contact list, recent message records, and the like of this application can be preloaded; if the target application is a game application, data related to game backgrounds of this application and the like can be preloaded.

After the target application is preloaded, if the user really wants to use the target application (for example, clicking an application icon corresponding to the target application), the target application will be triggered to launch. At this time, since all or part of resources required for launching have been preloaded, a launching speed of the target application will be significantly improved, which can reduce waiting time of the user. As a result, efficiency and fluency can be improved when the user uses the target application.

Figure 2:
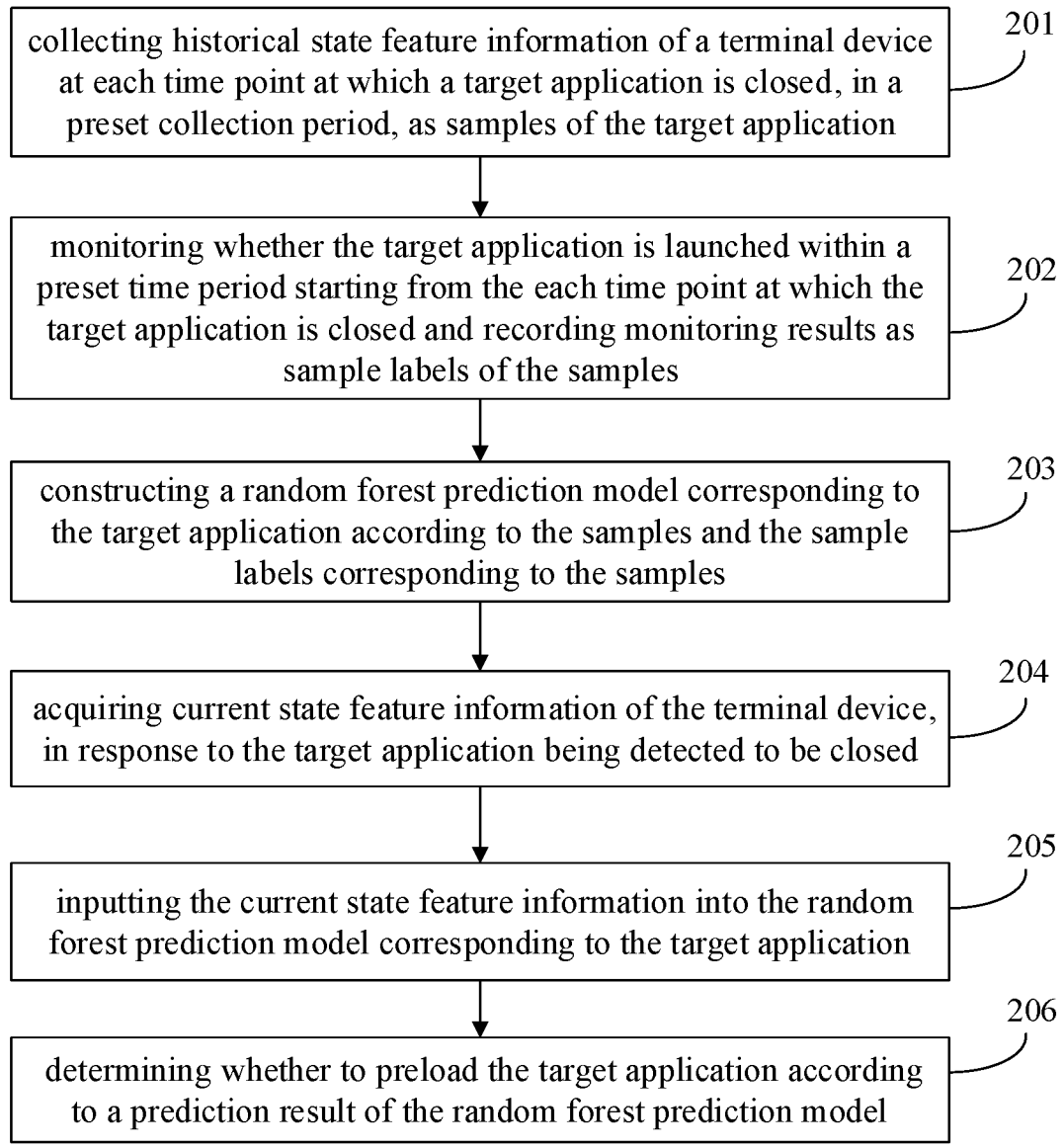
FIG. 2 is a schematic flow chart illustrating another method for preloading an application according to an implementation of the disclosure.

FIG. 2 is a schematic flow chart illustrating another method for preloading an application according to an implementation of the disclosure. The method begins at block 201.

At block 201, historical state feature information of a terminal device at each time point at which a target application is closed is collected, in a preset collection period, as samples of the target application.

At block 202, whether the target application is launched within a preset time period starting from the each time point at which the target application is closed is monitored and monitoring results are recorded as sample labels of the samples.

At block 203, a random forest prediction model corresponding to the target application is constructed according to the samples and the sample labels corresponding to the samples.

The samples are configured to indicate the historical state feature information of the terminal device at time points at which the target application is closed and the sample labels are configured to indicate whether the target application is launched within a preset time period starting from each time point at which the target application is closed.

At block 204, current state feature information of the terminal device is acquired, in response to the target application being detected to be closed.

At block 205, the current state feature information is input into the random forest prediction model corresponding to the target application.

The random forest prediction model is generated based on a usage regularity of the target application corresponding to the historical state feature information of the terminal device.

At block 206, whether to preload the target application is determined according to a prediction result of the random forest prediction model.

It should be noted that, when constructing the random forest prediction model corresponding to the target application, the terminal device may obtain corresponding samples and sample labels and train the corresponding samples and sample labels to generate a corresponding random forest prediction model. It is also possible that a server obtains corresponding samples and sample labels, and trains the corresponding samples and sample labels to generate a corresponding random forest prediction model. When the terminal device needs to input the first state feature into the random forest prediction model corresponding to the target application, a corresponding random forest prediction model can be invoked directly from the server.

According to the method for preloading the application of the implementation of the disclosure, the usage regularity of the target application corresponding to the historical state feature information of the terminal device can be fully utilized to generate the random forest prediction model, which further optimizes application preloading mechanisms and improves accuracy of determining whether to preload the target application.

Figure 3:
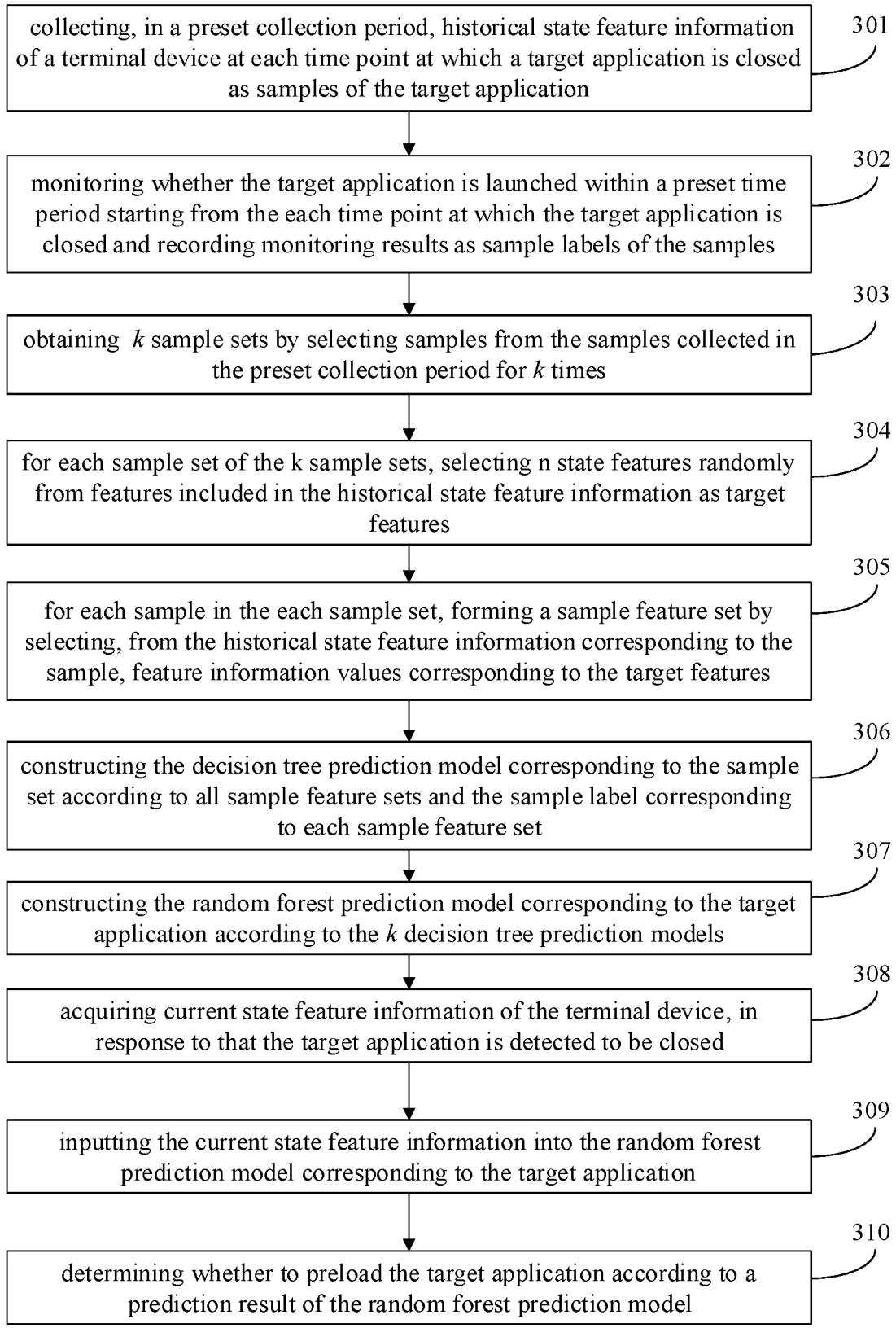
FIG. 3 is a schematic flow chart illustrating a method for preloading an application according to an implementation of the disclosure.

FIG. 3 is a schematic flow chart illustrating a method for preloading an application according to an implementation of the disclosure. The method begins at block 301.

At block 301, historical state feature information of a terminal device at each time point at which a target application is closed is collected, in a preset collection period, as samples of the target application.

At block 302, whether the target application is launched within a preset time period starting from the each time point at which the target application is closed is monitored and monitoring results are recorded as sample labels of the samples.

At block 303, k sample sets are obtained via sample selection of the samples for k times.

Each sample set includes m samples randomly selected from the samples.

A block 304, for each sample set of the k sample sets, select n state features randomly from features included in the historical state feature information as target features.

At block 305, for each sample in the each sample set, form a sample feature set by selecting, from the historical state feature information corresponding to the sample, feature information values corresponding to the target features.

At block 306, the decision tree prediction model corresponding to the sample set is constructed according to all sample feature sets and the sample label corresponding to each sample feature set.

At block 307, the random forest prediction model corresponding to the target application is constructed according to the k decision tree prediction models.

At block 308, current state feature information of the terminal device is acquired, in response to the target application being detected to be closed.

At block 309, the current state feature information is input into the random forest prediction model corresponding to the target application.

The random forest prediction model is generated based on a usage regularity of the target application corresponding to historical state feature information of the terminal device.

At block 310, whether to preload the target application is determined according to a prediction result of the random forest prediction model.

According to the method for the preloading the application, the number of the decision tree prediction models included in the random forest prediction model can be set randomly, which improves randomness of constructing the decision tree prediction models. In addition, accuracy and precision of predicting whether to preload the target application by the constructed random forest prediction model can be improved. Furthermore, several state features randomly selected from the features included in the historical state feature information can be used as target features for constructing various decision tree prediction models in the random forest prediction model. Under the premise of ensuring accuracy of predicting whether to preload the target application by the random forest prediction model, data volume processed during constructing the random forest prediction model can be effectively reduced.

Figure 4:
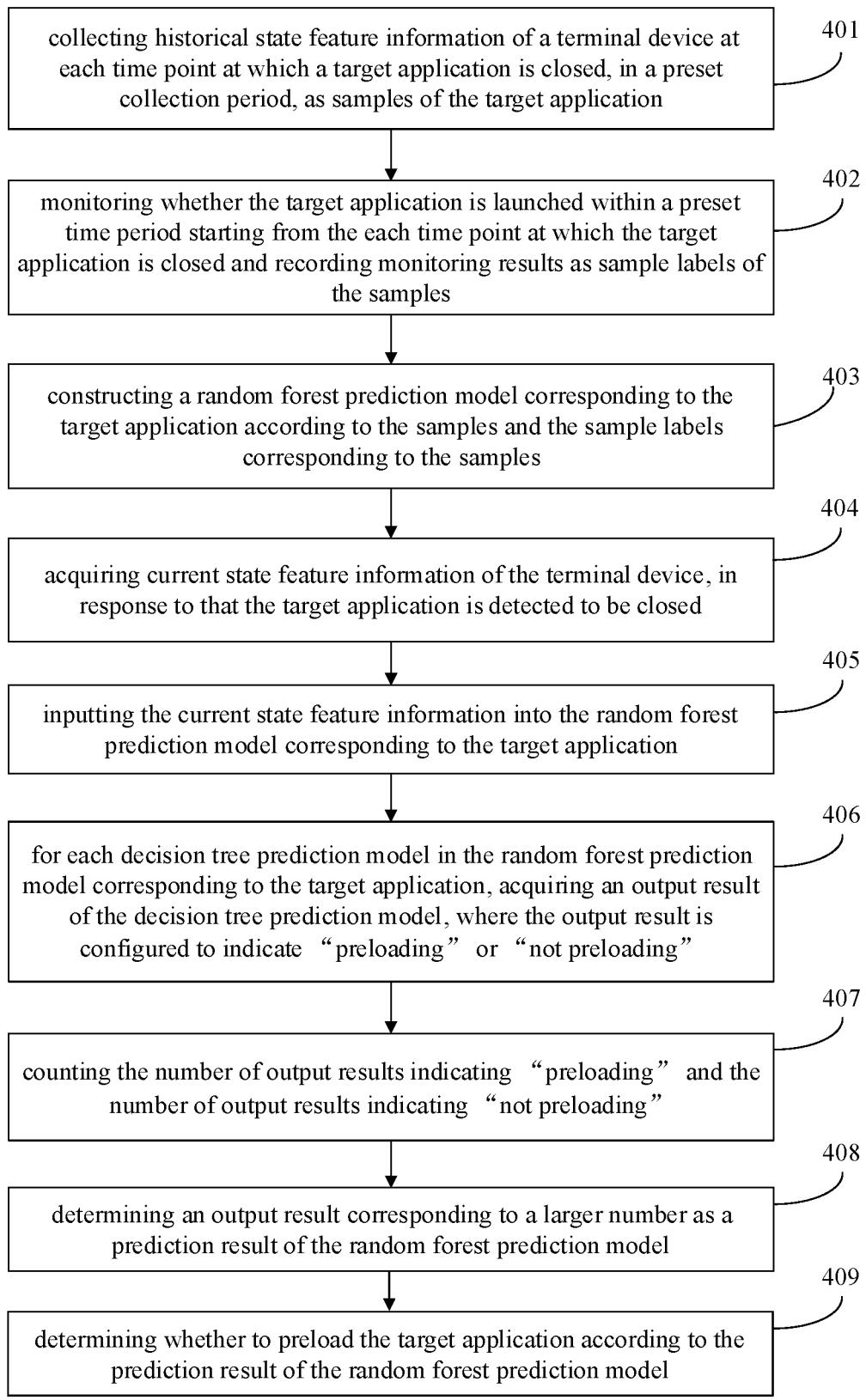
FIG. 4 is a schematic flow chart illustrating a method for preloading an application according to an implementation of the disclosure.

FIG. 4 is a schematic flow chart illustrating a method for preloading an application according to an implementation of the disclosure. The method begins at block 401.

At block 401, historical state feature information of a terminal device at each time point at which a target application is closed is collected, in a preset collection period, as samples of the target application.

At block 402, whether the target application is launched within a preset time period starting from the each time point at which the target application is closed is monitored and monitoring results are recorded as sample labels of the samples.

At block 403, a random forest prediction model corresponding to the target application is constructed according to the samples and the sample labels corresponding to the samples.

The samples are configured to indicate the historical state feature information of the terminal device at time points at which the target application is closed and the sample labels are configured to indicate whether the target application is launched within a preset time period starting from each time point at which the target application is closed.

At block 404, current state feature information of the terminal device is acquired, in response to the target application being detected to be closed.

At block 405, the current state feature information is input into the random forest prediction model corresponding to the target application.

The random forest prediction model is generated based on a usage regularity of the target application corresponding to historical state feature information of the terminal device.

At block 406, for each decision tree prediction model in the random forest prediction model corresponding to the target application, acquire an output result of the decision tree prediction model, where the output result is configured to indicate "preloading" or "not preloading".

It is to be noted that, the output result of a leaf node that matches the current state feature information in the decision tree prediction model is acquired as the output result of the decision tree prediction model.

At block 407, the number of output results indicating "preloading" and the number of output results indicating "not preloading" are counted.

At block 408, an output result corresponding to a larger number is determined as a prediction result of the random forest prediction model.

At block 409, whether to preload the target application is determined according to the prediction result of the random forest prediction model.

When the target application is determined to be preloaded according to the prediction result, storage space information of the terminal device is acquired. When the storage space information is greater than a preset space threshold, the target application will be preloaded.

According to the method for the preloading the application, it is possible to determine reasonably whether to preload the target application according to voting results of various decision tree prediction models in the random forest prediction model.

Figure 5:
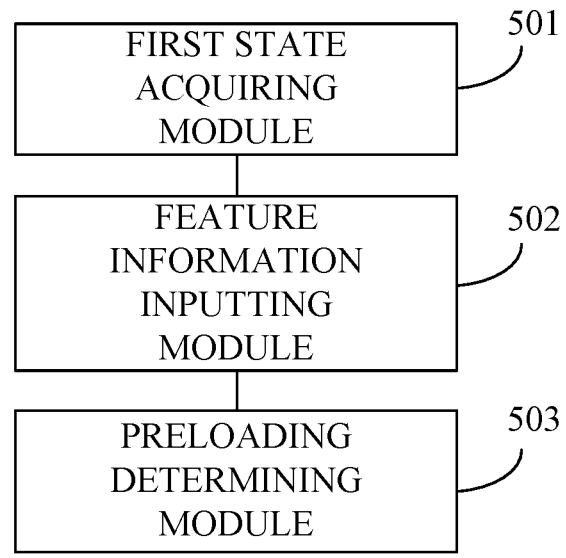
FIG. 5 is a schematic structural diagram illustrating a device for preloading an application according to an implementation of the disclosure.

FIG. 5 is a schematic structural diagram illustrating a device for preloading an application according to an implementation of the disclosure. The device can be implemented with software and/or hardware and can be generally integrated in a terminal. The device can preload an application to be launched by executing the method for preloading the application. As illustrated in FIG. 5, the device includes a first state acquiring module 501, a feature information inputting module 502, and a preloading determining module 503.

The first state acquiring module 501 is configured to acquire current state feature information of a terminal device, when a target application is detected to be closed. The feature information inputting module 502 is configured to input the current state feature information into a random forest prediction model corresponding to the target application, where the random forest prediction model is generated based on a usage regularity of the target application corresponding to historical state feature information of the terminal device. The preloading determining module 503 is configured to determine whether to preload the target application according to a prediction result of the random forest prediction model.

According to the device for preloading the application, the current state feature information of the terminal device is acquired, when the target application is detected to be closed. The current state feature information is then input into the random forest prediction model corresponding to the target application, where the random forest prediction model is generated based on the usage regularity of the target application corresponding to the historical state feature information of the terminal device. At last, whether to preload the target application is determined according to the prediction result of the random forest prediction model. By adopting the above device, the technical problems of preloading too many resources for the application, occupying too many resources, increasing power consumption, and even affecting fluency on the use of the terminal can be solved. In addition, accuracy of determining whether to preload the target application can be improved effectively, system power consumption and memory occupancy of the terminal can be further reduced, and application preloading mechanisms can be optimized.

As one implementation, the device further includes a prediction model constructing module.

The prediction model constructing module is configured to construct the random forest prediction model corresponding to the target application according to samples of the target application and sample labels corresponding to the samples.

The samples are configured to indicate the historical state feature information of the terminal device at time points at which the target application is closed and the sample labels are configured to indicate whether the target application is launched within a preset time period starting from each time point at which the target application is closed.

As one implementation, the device further includes a sample collecting module.

The sample collecting module is configured to collect, in a preset collection period, before random forest prediction model is constructed, the historical state feature information of the terminal device at each time point at which the target application is closed, as the samples of the target application, to monitor whether the target application is launched within the preset time period starting from the each time point at which the target application is closed, and to record monitoring results as the sample labels of the samples.

As one implementation, the prediction model constructing module includes a sample selecting unit, a first prediction model constructing unit, and a second prediction model constructing unit.

The sample selecting unit is configured to obtain k sample sets via sample selection of the samples for k times, where each sample set includes m samples randomly selected from the samples. The first prediction model constructing unit is configured to construct a decision tree prediction model for each sample set of the k sample sets according to the m samples included in the sample set and sample labels corresponding to the m samples. The second prediction model constructing unit is configured to construct the random forest prediction model corresponding to the target application according to the k decision tree prediction models.

As one implementation, the first prediction model constructing unit is configured to select n state features randomly from features included in the historical state feature information as target features, to select, for each sample in the each sample set, from the historical state feature information corresponding to the sample, feature information values corresponding to the target features to form a sample feature set, and to construct the decision tree prediction model corresponding to the sample set according to all sample feature sets and the sample label corresponding to each sample feature set.

As one implementation, the device further includes an acquiring module, a counting module, and a determining module.

The acquiring module is configured to acquire an output result of the decision tree prediction model, where the output result is configured to indicate "preloading" or "not preloading". The counting module is configured to count the number of output results indicating "preloading" and the number of output results indicating "not preloading". The determining module is configured to determine an output result corresponding to a larger number as the prediction result of the random forest prediction model.

As one implementation, the acquiring module is configured to acquire an output result of a leaf node that matches the current state feature information in the decision tree prediction model as the output result of the decision tree prediction model.

As one implementation, the device further includes a storage space acquiring module and an application preloading module.

The storage space acquiring module is configured to acquire storage space information of the terminal device when the target application is determined to be preloaded according to the prediction result. The application preloading module is configured to preload the target application when the storage space information is greater than a preset space threshold.

As one implementation, the current state feature information and the historical state feature information each includes at least one of: time information, a date category, a switching state of a mobile data network, a connection state of a wireless hotspot, identity information of a connected wireless hotspot, an application currently running, a previous foreground application, a length of stay of the target application in the background, a time point at which the target application was last switched to the background, plugging and unplugging states of an earphone jack, a charging state, power information of a battery, a display duration of a screen, a movement state of the terminal device, location information, a connection state of a Bluetooth, a running duration of the target application in the foreground before the target application is closed, and a most recent screen-off duration.

Implementations of the disclosure also provide a non-transitory computer readable storage medium. The non-transitory computer readable storage medium is configured to store a computer program which, when executed by a processor, causes the processor to carry out the following.

Current state feature information of a terminal device is acquired, when a target application is detected to be closed. The current state feature information is input into a random forest prediction model corresponding to the target application, where the random forest prediction model is generated based on a usage regularity of the target application corresponding to historical state feature information of the terminal device. Whether to preload the target application is determined according to a prediction result of the random forest prediction model.

The processor is further configured to carry out constructing the random forest prediction model corresponding to the target application according to samples of the target application and sample labels corresponding to the samples. The samples are configured to indicate the historical state feature information of the terminal device at time points at which the target application is closed and the sample labels are configured to indicate whether the target application is launched within a preset time period starting from each time point at which the target application is closed.

The non-transitory computer readable storage medium refers to any of various types of memory devices or storage devices. The term "non-transitory computer readable storage medium" is intended to include: a mounting medium such as a compact disc read-only memory (CD-ROM), a floppy disk, or a tape device; computer system memory or random access memory such as a dynamic random access memory (DRAM), a display data random access memory (DDR-RAM), a static random access memory (SRAM), an extended data output random access memory (EDORAM) and a Rambus random access memory (Rambus RAM); non-transitory memory such as a flash memory and a magnetic medium (such as a hard disk or an optical memory); a register and other similar types of memory element, and the like. The non-transitory computer readable storage medium may also include other types of memory or a combination thereof. In addition, the non-transitory computer readable storage medium may be located in a first computer system in which a program is executed, or may be located in a second computer system coupled to the first computer system via a network, such as the Internet. The second computer system can provide program instructions to the first computer for execution. The term "non-transitory computer readable storage medium" can include two or more storage media that can reside in different locations (e.g. different computer systems connected through a network). The non-transitory computer readable storage medium may store program instructions (e.g. computer programs) executable by one or more processors.

In the implementations of the disclosure, the computer executable instructions contained in the non-transitory computer readable storage medium are not limited to executing the operations of preloading the application as described above, and can also execute relevant operations of the method for preloading the application according to the implementations of the disclosure.

Figure 6:
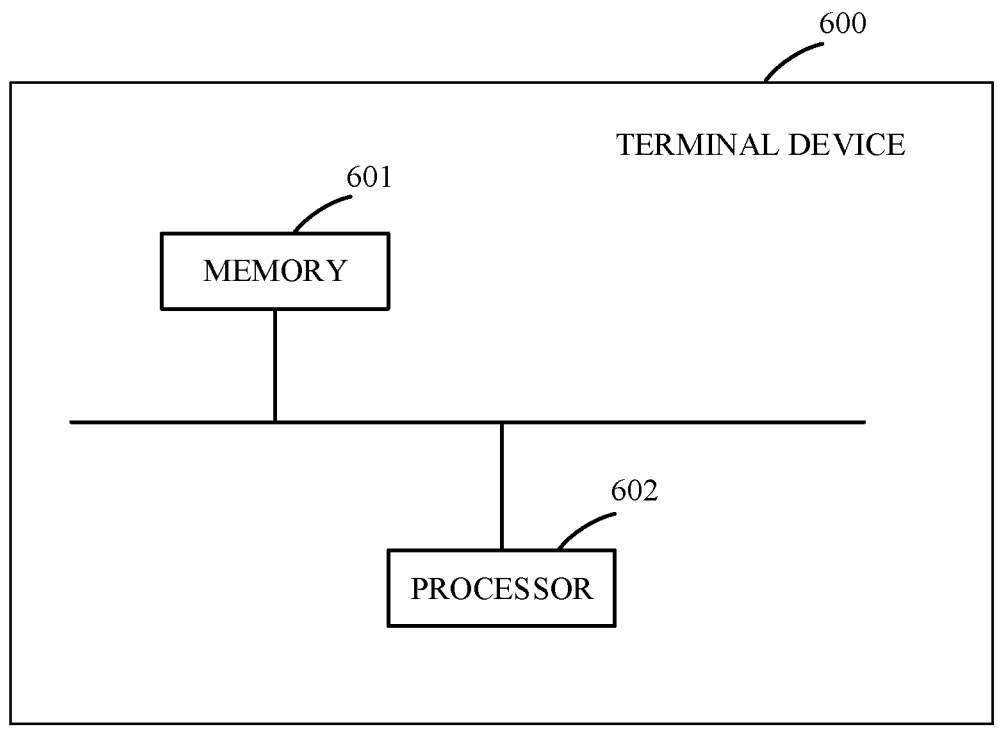
FIG. 6 is a schematic structural diagram illustrating a terminal device according to an implementation of the disclosure.

Implementations of the disclosure provide a terminal device. The device for preloading the application of the implementations of the disclosure can be integrated into the terminal device. The terminal device includes at least one processor and a computer readable storage coupled to the at least one processor and stores at least one computer executable instruction thereon. FIG. 6 is a schematic structural diagram illustrating the terminal device according to an implementation of the disclosure, in the form of a terminal device including a memory and a processor. As illustrated in FIG. 6, the terminal device 600 includes a memory 601 a processor 602, and computer programs stored in the memory 601 and executed by the processor 602. The processor 602 is configured to execute the computer programs to implement the method for preloading the application of the implementations of the disclosure.

Specifically, the processor 602 is configured to acquire current state feature information of the terminal device, in response to a target application being detected to be closed, and to determine whether to preload the target application according to the current state feature information and a random forest prediction model corresponding to the target application, where the random forest prediction model is generated based on a usage regularity of the target application corresponding to historical state feature information of the terminal device.

In terms of the determining whether to preload the target application according to the current state feature information and a random forest prediction model corresponding to the target application, the processor 602 is configured to input the current state feature information into the random forest prediction model corresponding to the target application and to determine whether to preload the target application according to a prediction result of the random forest prediction model.

The random forest prediction model is composed of multiple decision tree prediction models and the processor 602 is further configured to acquire, for each decision tree prediction model in the random forest prediction model corresponding to the target application, an output result of the decision tree prediction model, where the output result is configured to indicate "preloading" or "not preloading", to count the number of output results indicating "preloading" and the number of output results indicating "not preloading", and to determine an output result corresponding to a larger number as the prediction result of the random forest prediction model.

In terms of the acquiring an output result of the decision tree prediction model, the processor 602 is configured to acquire an output result of a leaf node that matches the current state feature information in the decision tree prediction model as the output result of the decision tree prediction model.

The processor 602 is further configured to construct the random forest prediction model corresponding to the target application according to samples of the target application and sample labels corresponding to the samples. The samples are configured to indicate the historical state feature information of the terminal device at time points at which the target application is closed and the sample labels are configured to indicate whether the target application is launched within a preset time period starting from each time point at which the target application is closed.

The processor 602 is further configured to collect, in a preset collection period, the historical state feature information of the terminal device at time points at which the target application is closed, as the samples of the target application, to monitor whether the target application is launched within the preset time period starting from the each time point at which the target application is closed, and to record monitoring results as the sample labels of the samples.

In terms of the constructing the random forest prediction model corresponding to the target application according to samples of the target application and sample labels corresponding to the samples, the processor 602 is configured to obtain k sample sets via sample selection of the samples for k times, where each sample set includes m samples randomly selected from the samples, to construct a decision tree prediction model for each sample set of the k sample sets according to the m samples included in the sample set and sample labels corresponding to the m samples, and to construct the random forest prediction model corresponding to the target application according to k decision tree prediction models.

In terms of the constructing a decision tree prediction model for each sample set of the k sample sets according to the m samples included in the sample set and sample labels corresponding to the m samples, the processor 602 is configured to select n state features randomly from features included in the historical state feature information as target features, to form a sample feature set, for each sample in the sample set, by selecting, from the historical state feature information corresponding to the sample, feature information values corresponding to the target features, and to construct the decision tree prediction model corresponding to the sample set according to all sample feature sets and the sample label corresponding to each sample feature set.

The processor 602 is further configured to acquire storage space information of the terminal device when the target application is determined to be preloaded according to the prediction result and to preload the target application when the storage space information is greater than a preset space threshold.

The current state feature information and the historical state feature information each includes at least one of: time information, a date category, a switching state of a mobile data network, a connection state of a wireless hotspot, identity information of a connected wireless hotspot, an application currently running, a previous foreground application, a length of stay of the target application in the background, a time point at which the target application was last switched to the background, plugging and unplugging states of an earphone jack, a charging state, power information of a battery, a display duration of a screen, a movement state of the terminal device, location information, a connection state of a Bluetooth, a running duration of the target application in the foreground before the target application is closed, and a most recent screen-off duration.

According to the terminal device of the implementation of the disclosure, the current state feature information of the terminal device is acquired, when the target application is detected to be closed. The current state feature information is then input into the random forest prediction model corresponding to the target application, where the random forest prediction model is generated based on the usage regularity of the target application corresponding to the historical state feature information of the terminal device. At last, whether to preload the target application is determined according to the prediction result of the random forest prediction model. By adopting the above method, the technical problems of preloading too many resources for the application, occupying too many resources, increasing power consumption, and even affecting fluency on the use of the terminal can be solved. In addition, accuracy of determining whether to preload the target application can be improved effectively, system power consumption and memory occupancy of the terminal can be further reduced, and application preloading mechanisms can be optimized.

Figure 7:
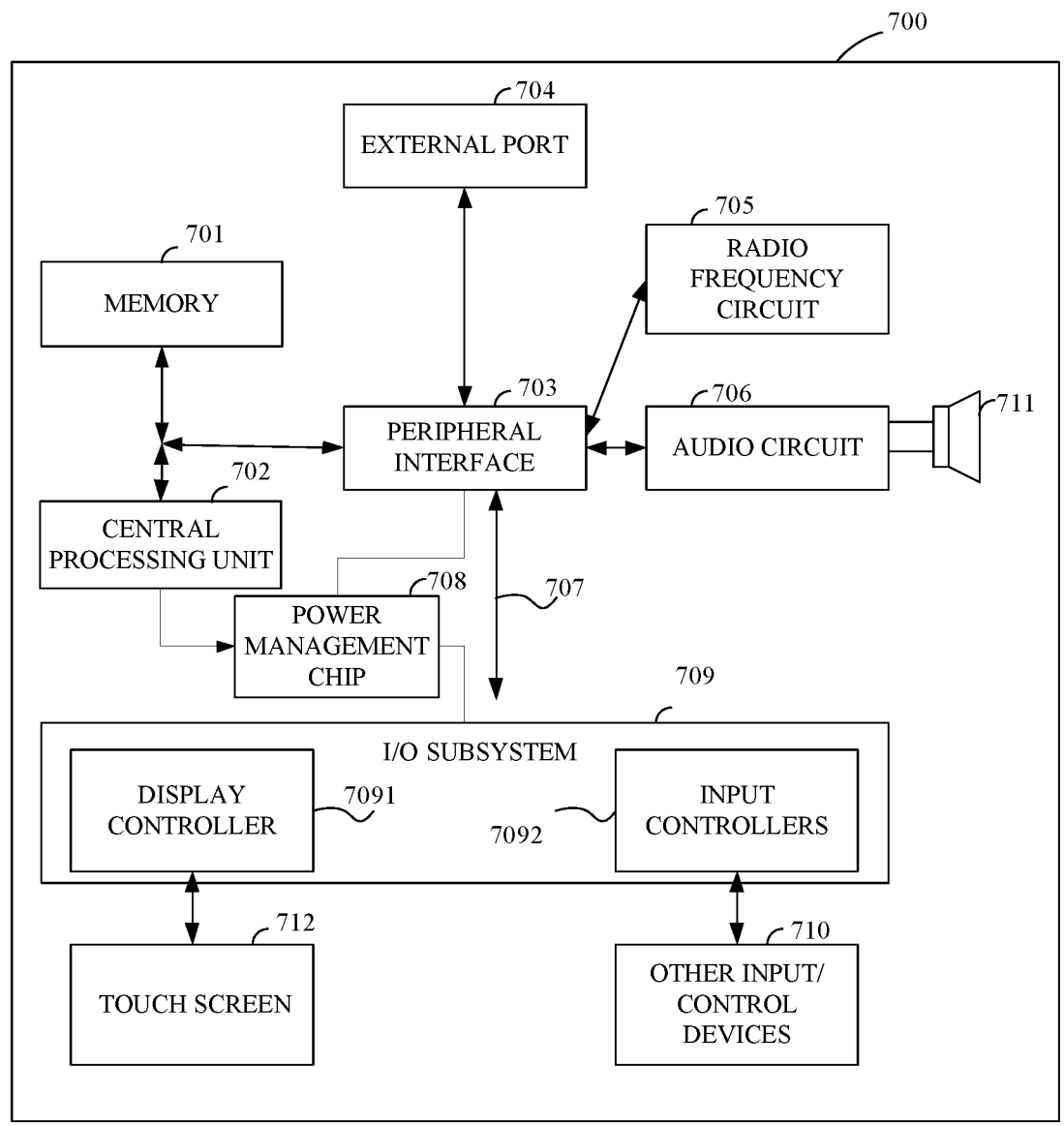
FIG. 7 is a schematic structural diagram illustrating another terminal device according to an implementation of the disclosure.

FIG. 7 is a schematic structural diagram illustrating another terminal device according to an implementation of the disclosure. As illustrated in FIG. 7, the terminal device includes a housing (not illustrated), a memory 701, and a central processing unit (CPU) 702 (also referred to as a processor, hereinafter CPU for short), a circuit board (not illustrated), and a power supply circuit (not illustrated). The circuit board is disposed inside a space defined by the housing. The CPU 702 and the memory 701 are disposed on the circuit board. The power supply circuit is configured to supply power for each circuit or component of the terminal. The memory 701 is configured to store executable program codes. The CPU 702 is configured to run a computer program corresponding to the executable program codes by reading the executable program codes stored in the memory 701 to carry out the following operations.

Current state feature information of a terminal device is acquired, when a target application is detected to be closed. The current state feature information is input into a random forest prediction model corresponding to the target application, where the random forest prediction model is generated based on a usage regularity of the target application corresponding to historical state feature information of the terminal device. Whether to preload the target application is determined according to a prediction result of the random forest prediction model.

The terminal further includes a peripheral interface 703, an radio frequency (RF) circuit 705, an audio circuit 706, a speaker 711, a power management chip 708, an input/output (I/O) subsystem 709, other input/control devices 710, a touch screen 712, other input/control devices 710, and an external port 704, which are communicated via one or more communication buses or signal lines 707.

It should be understood that, the terminal 700 illustrated is exemplary and the terminal 700 may have more or fewer components than those illustrated in FIG. 7. For example, two or more components may be combined, or different component configurations can be adopted in the terminal. The various components illustrated in FIG. 7 can be implemented in hardware, software, or a combination of hardware and software including one or more signal processing and/or application specific integrated circuits.

The following describes a mobile phone as an example of the terminal device for preloading an application.

The memory 701 is accessible by the CPU 702, the peripheral interface 703 and so on. The memory 701 may include a high-speed random access memory and may further include a non-transitory memory such as one or more magnetic disk storage devices, flash memory devices, or other transitory solid-state memory devices.

The peripheral interface 703 is configured to connect the input and output peripherals of the device to the CPU 702 and the memory 701.

The I/O subsystem 709 is configured to connect the input and the output peripherals such as the touch screen 712 and other input/control devices 710 to the peripheral interface 703. The I/O subsystem 709 may include a display controller 7091 and one or more input controllers 7092 configured to control other input/control devices 710. The one or more input controllers 7092 are configured to receive electrical signals from or send electrical signals to other input/control devices 710, where other input/control devices 710 may include a physical button (a press button, a rocker button, etc.), a dial, a slide switch, a joystick, or a click wheel. It should be noted that the input controller 7092 can be coupled with any of a keyboard, an infrared port, a universal serial bus (USB) interface, and a pointing apparatus such as a mouse.

The touch screen 712 functions as an input interface and an output interface between a terminal and a user, and is configured to display a visual output to the user. The visual output may include graphics, text, icons, videos, and the like.

The display controller 7091 in the I/O subsystem 709 is configured to receive an electrical signal from or send an electrical signal to the touch screen 712. The touch screen 712 is configured to detect contact or touch on the touch screen. The display controller 7091 is configured to convert the contact detected into an interaction with a user interface object displayed on the touch screen 712, that is, to realize human-computer interaction. The user interface object displayed on the touch screen 712 may be an icon of a running game, an icon indicating connection to corresponding networks, and the like. It should be noted that, the device may also include a light mouse, which is a touch sensitive surface that does not display a visual output, or can be an extension of a touch sensitive surface formed by the touch screen.

The RF circuit 705 is configured to establish communication between a mobile phone and the wireless network (i.e. network side) and to transmit and receive data between the mobile phone and the wireless network, for example, transmit and receive short messages, emails, and the like. The RF circuit 705 is configured to receive and transmit RF signals (also known as electromagnetic signals), to convert an electrical signal into an electromagnetic signal or convert an electromagnetic signal into an electrical signal, and to communicate with a communication network and other devices through electromagnetic signals. The RF circuit may include known circuits for performing these functions, including but not limited to an antenna system, an RF transceiver, one or more amplifiers, a tuner, one or more oscillators, a digital signal processor, a coder-decoder (CODEC) chipset, a subscriber identity module (SIM) and so on.

The audio circuit 706 is configured to receive audio data from the peripheral interface 703, to convert the audio data into an electric signal, and to transmit the electric signal to the speaker 711.

The speaker 711 is configured to restore the voice signal received by the mobile phone from the wireless network via the RF circuit 705 to sound and to play the sound to the user.

The power management chip 708 is configured for power supply and power management of the hardware connected to the CPU 702, the I/O subsystem 709, and the peripheral interfaces 703.

The device for preloading the application, the non-transitory computer readable storage medium, and the terminal device of the above implementations have corresponding functional modules and can execute the corresponding method for preloading the application, and thus each contributes to advantageous effects of executing the method. For technical details not described herein, reference may be made to the description of the method for preloading the application.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for preloading an application, comprising:
collecting, in a preset collection period, historical state feature information of the terminal device at time points at which the target application is closed, as samples of the target application;
monitoring whether the target application is launched within the preset time period starting from the each time point at which the target application is closed;
recording monitoring results as sample labels of the samples;
constructing a random forest prediction model corresponding to the target application according to the samples of the target application and the sample labels corresponding to the samples, wherein the samples are configured to indicate the historical state feature information of the terminal device at time points at which the target application is closed, and the sample labels are configured to indicate whether the target application is launched within a preset time period starting from each time point at which the target application is closed;
acquiring current state feature information of a terminal device, in response to a target application being detected to be closed;
inputting the current state feature information into the random forest prediction model corresponding to the target application, wherein the random forest prediction model is generated based on a usage regularity of the target application corresponding to historical state feature information of the terminal device; and
determining whether to preload the target application according to a prediction result of the random forest prediction model.

2. The method of claim 1, wherein constructing the random forest prediction model corresponding to the target application according to samples of the target application and sample labels corresponding to the samples comprises:
obtaining k sample sets via sample selection of the samples for k times, wherein each sample set comprises m samples randomly selected from the samples;
constructing a decision tree prediction model for each sample set of the k sample sets according to the m samples included in the sample set and sample labels corresponding to the m samples; and
constructing the random forest prediction model corresponding to the target application according to k decision tree prediction models.

3. The method of claim 2, wherein constructing the decision tree prediction model for each sample set of the k sample sets according to the m samples included in the sample set and sample labels corresponding to the m samples comprises:
selecting n state features randomly from features included in the historical state feature information as target features;
for each sample in the sample set, forming a sample feature set by selecting, from the historical state feature information corresponding to the sample, feature information values corresponding to the target features; and
constructing the decision tree prediction model corresponding to the sample set according to all sample feature sets and the sample label corresponding to each sample feature set.

4. The method of claim 1, further comprising:
for each decision tree prediction model in the random forest prediction model corresponding to the target application, acquiring an output result of the decision tree prediction model, wherein the output result is configured to indicate "preloading" or "not preloading";
counting the number of output results indicating "preloading" and the number of output results indicating "not preloading"; and
determining an output result corresponding to a larger number as the prediction result of the random forest prediction model.

5. The method of claim 4, wherein acquiring the output result of the decision tree prediction model comprises:
acquiring an output result of a leaf node that matches the current state feature information in the decision tree prediction model as the output result of the decision tree prediction model.

6. The method of claim 1, further comprising:
acquiring storage space information of the terminal device when the target application is determined to be preloaded according to the prediction result; and
preloading the target application when the storage space information is greater than a preset space threshold.

7. The method of claim 1, wherein the current state feature information and the historical state feature information each comprises at least one of: time information, a date category, a switching state of a mobile data network, a connection state of a wireless hotspot, identity information of a connected wireless hotspot, an application currently running, a previous foreground application, a length of stay of the target application in the background, a time point at which the target application was last switched to the background, plugging and unplugging states of an earphone jack, a charging state, power information of a battery, a display duration of a screen, a movement state of the terminal device, location information, a connection state of a Bluetooth, a running duration of the target application in the foreground before the target application is closed, and a most recent screen-off duration.

8. A terminal device, comprising:
at least one processor; and
a computer readable storage, coupled to the at least one processor and storing at least one computer executable instruction thereon which, when executed by the at least one processor, causes the at least one processor to:
collect, in a preset collection period, historical state feature information of the terminal device at time points at which the target application is closed, as samples of the target application;
monitor whether the target application is launched within the preset time period starting from the each time point at which the target application is closed;
record monitoring results as sample labels of the samples;
construct the random forest prediction model corresponding to the target application according to the samples of the target application and the sample labels corresponding to the samples, wherein the samples are configured to indicate the historical state feature information of the terminal device at time points at which the target application is closed; and the sample labels are configured to indicate whether the target application is launched within a preset time period starting from each time point at which the target application is closed;
acquire current state feature information of the terminal device, in response to a target application being detected to be closed; and
determine whether to preload the target application according to the current state feature information and the random forest prediction model corresponding to the target application, wherein the random forest prediction model is generated based on a usage regularity of the target application corresponding to historical state feature information of the terminal device.

9. The terminal device of claim 8, wherein the at least one processor configured to determine whether to preload the target application according to the current state feature information and a random forest prediction model corresponding to the target application is configured to:
input the current state feature information into the random forest prediction model corresponding to the target application; and
determine whether to preload the target application according to a prediction result of the random forest prediction model.

10. The terminal device of claim 9, wherein the random forest prediction model is composed of a plurality of decision tree prediction models, and the at least one processor is further configured to:
for each decision tree prediction model in the random forest prediction model corresponding to the target application, acquire an output result of the decision tree prediction model, wherein the output result is configured to indicate "preloading" or "not preloading";

count the number of output results indicating "preloading" and the number of output results indicating "not preloading"; and determine an output result corresponding to a larger number as the prediction result of the random forest prediction model.

11. The terminal device of claim 10, wherein the at least one processor configured to acquire the output result of the decision tree prediction model is configured to:

acquire an output result of a leaf node that matches the current state feature information in the decision tree prediction model as the output result of the decision tree prediction model.

12. The terminal device of claim 8, wherein the at least one processor configured to construct the random forest prediction model corresponding to the target application according to samples of the target application and sample labels corresponding to the samples is configured to:

obtain k sample sets via sample selection of the samples for k times, wherein each sample set comprises m samples randomly selected from the samples;

construct a decision tree prediction model for each sample set of the k sample sets according to the m samples included in the sample set and sample labels corresponding to the m samples; and construct the random forest prediction model corresponding to the target application according to k decision tree prediction models.

13. The terminal device of claim 12, wherein the at least one processor configured to construct the decision tree prediction model for each sample set of the k sample sets according to the m samples included in the sample set and sample labels corresponding to the m samples is configured to:

select n state features randomly from features included in the historical state feature information as target features;

for each sample in the sample set, form a sample feature set by selecting, from the historical state feature information corresponding to the sample, feature information values corresponding to the target features; and construct the decision tree prediction model corresponding to the sample set according to all sample feature sets and the sample label corresponding to each sample feature set.

14. The terminal device of claim 8, wherein the at least one processor is further configured to:

acquire storage space information of the terminal device when the target application is determined to be preloaded according to the prediction result; and preload the target application when the storage space information is greater than a preset space threshold.

15. A non-transitory computer readable storage medium storing a computer program which, when executed by a processor, causes the processor to:

collect, in a preset collection period, historical state feature information of the terminal device at time points at which the target application is closed, as samples of the target application;

monitor whether the target application is launched within the preset time period starting from the each time point at which the target application is closed;

record monitoring results as sample labels of the samples;

construct the random forest prediction model corresponding to the target application according to the samples of the target application and the sample labels corresponding to the samples, wherein the samples are configured to indicate the historical state feature information of the terminal device at time points at which the target application is closed; and the sample labels are configured to indicate whether the target application is launched within a preset time period starting from each time point at which the target application is closed;

acquire current state feature information of a terminal device, in response to a target application being detected to be closed;

input the current state feature information into the random forest prediction model corresponding to the target application, wherein the random forest prediction model is generated based on a usage regularity of the target application corresponding to historical state feature information of the terminal device; and determine whether to preload the target application according to a prediction result of the random forest prediction model.

* * * * *